(No Model.)

A. S. FLINT.
VEHICLE WHEEL.

No. 498,255. Patented May 30, 1893.

Witnesses:
Fred. J. Dole.
W. G. Richards.

Inventor.
Alvin S. Flint.
By his Attorney,
F. H. Richards.

UNITED STATES PATENT OFFICE.

ALVIN S. FLINT, OF HARTFORD, CONNECTICUT, ASSIGNOR OF ONE-HALF TO FRANK R. SLOCUM, OF SAME PLACE.

VEHICLE-WHEEL.

SPECIFICATION forming part of Letters Patent No. 498,255, dated May 30, 1893.

Application filed February 4, 1893. Serial No. 461,064. (No model.)

*To all whom it may concern:*

Be it known that I, ALVIN S. FLINT, a citizen of the United States, residing at Hartford, in the county of Hartford and State of Connecticut, have invented certain new and useful Improvements in Vehicle-Wheels, of which the following is a specification.

This invention relates to wheels for vehicles, and to that class of vehicle-wheels generally designated "wagon-wheels."

The object of the invention is to provide a tired wheel adapted to have the tire thereof adjustably held in place by mechanical appliances, whereby the tire when removed may be replaced on the wheel-fellies without heating.

Figure 1:
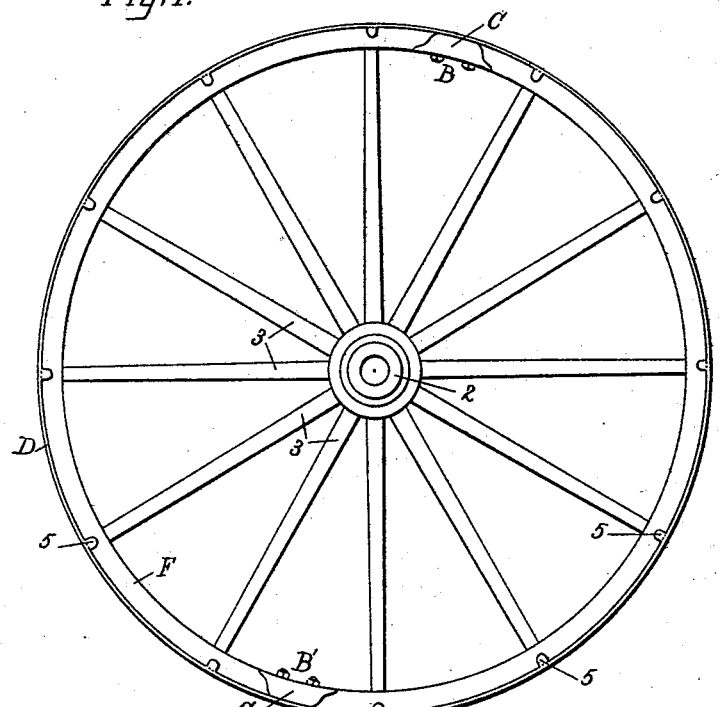
Figure 2:
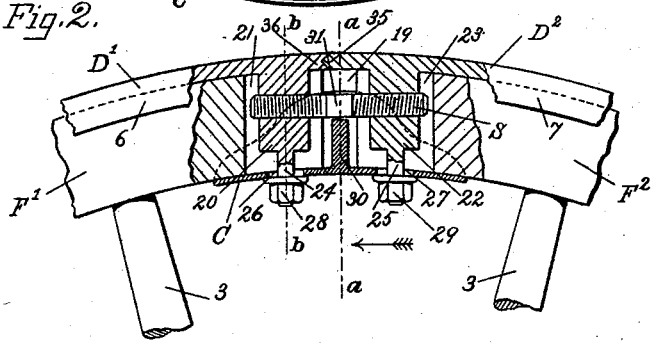
Figure 3:
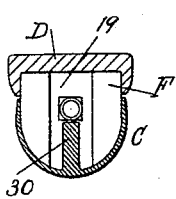
Figure 4:
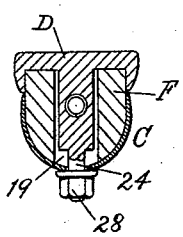
Figure 5:
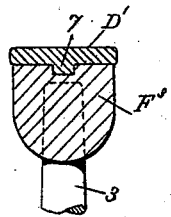
Figure 6:
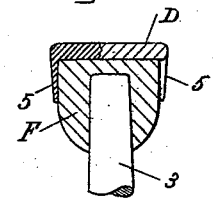
Figure 7:
Figure 9:
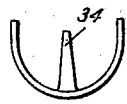
Figure 8:
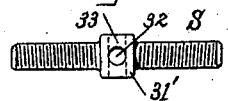
Figure 10:
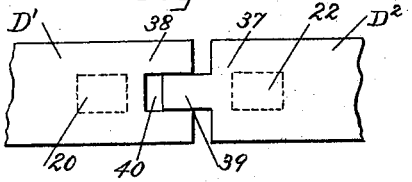

In the drawings accompanying and forming a part of this specification, Figure 1 is a side view of a vehicle-wheel furnished with my present improvements. Fig. 2 is an enlarged sectional side view of a portion of the wheel shown in Fig. 1. Fig. 3 is a sectional view in line $a$ $a$ of Fig. 2. Fig. 4 is a sectional view in line $b$ $b$ of Fig. 2. Fig. 5 illustrates a modification in the construction of the tire of the wheel. Fig. 6 is a section of the felly of the wheel shown in Fig. 1, at one of the wheel-spokes, and illustrates the construction and purpose of the side-clips of the tire shown in Fig. 1. Fig. 7 is a side view of the adjusting-screw shown in Fig. 1. Fig. 8 is a modification of the adjusting-screw shown in Fig. 7. Fig. 9 is an end view of the clip constructed for engaging the form of adjusting-screw shown in Fig. 8. Fig. 10 illustrates a modification of the tire-joint whereby the ends of the same are made to interlock and are adjustable for sliding engagement.

Similar characters designate like parts in all the figures.

My improved vehicle-wheel, like others of the same general class, consists of the usual hub 2, a series of spokes 3, the felly F carried on the outer ends of the spokes, a tire (designated in a general way by D) surrounding the felly, and means for holding the tire in place.

According to my present improvements, the tire D is held in place laterally of the felly by some form of locking engagement therewith, of which the preferred form is shown in Figs. 1 and 6, the means referred to consisting in a series of side-clips 5 projecting inwardly from the edges of the tire and fitting closely upon the sides of the felly at the points where the spokes enter the felly. This will be understood by comparison of Figs. 1 and 6, in which the clips are shown located as described, and, as illustrated in Fig. 6, closely clasping the sides of the felly for preventing this from being split or spread open by the forcing of the spoke thereinto.

Another manner of holding the tire in the proper position laterally upon the felly is shown in Figs. 2, 3 and 4, and consists of the two continuous side-flanges 6 and 7, which (similarly to the aforesaid clips) closely engage the sides of the felly for preventing the splitting of the same. Another modification of the particular construction of the tire is illustrated in Fig. 5, where the tire D' has the central inner rib 7 fitting in a corresponding groove in the periphery of the felly $F^3$.

The wheel shown in Fig. 1 is provided with a severed tire in two parts, and with two opposite tire-adjusting devices, which are designated in a general way by B, B'; these two devices being supposed to be of the same construction, a detailed description of one of them will serve as a description of both. For this purpose reference is had to Figs. 2, 3, 4 and 7. At the place in the periphery of the wheel where the tire-adjusting device is to be applied, the adjacent fellies, or felly-sections, F' and $F^2$, are shown cut away to leave between the ends thereof a sufficient space, as 19, Fig. 2, in which (when the clip C is removed) a wrench may be inserted for actuating the adjusting-screw. In the ends of said tire-sections F' and $F^2$ are formed two longitudinal mortises, 21 and 23, respectively, for receiving the studs 20 and 22 which are rigidly fixed to or formed on the inner sides of the contiguous ends D' and $D^2$, respectively, of the tire. Said studs 20 and 22 are transversely perforated by threaded holes which stand in alignment longitudinally of the felly, as illustrated in Fig. 2, for receiving the adjusting-screw S, whereby to adjust the tire-ends; said screw is of the well-known right- and-left-hand variety, as indicated by the detail view thereof in Fig. 7, having the central head 31. The tire-studs 20, 22 are shown provided with the projecting bolt-ends 24 and 25, respectively, which extend through slotted openings, 26 and 27, in the clip C, and on the inner side of said clip are furnished with nuts and washers, 28 and 29, for holding the clip in place, and for firmly binding the felly-sections F' and F² between said clip and the tire.

As a means for preventing the adjusting-screw S from turning, by jarring or otherwise, when the clip is in place, said clip is shown furnished with the screw-stop 30, which, as illustrated in Figs. 2 and 3, stands contiguous to the squared head 31 of the screw S, and thereby prevents the screw from turning until after the clip C is removed. The construction and arrangement here described of the tire-studs, the clip, and means for holding the clip in place, are further illustrated by the sectional view, Fig. 4, which will be understood without further description.

In Fig. 8 is shown a modified form of the adjusting-screw S, this having the round middle portion 31' thereof transversely perforated in crosswise directions by the holes 32 and 33, after a well-known manner. And in Fig. 9 is shown a clip having the retaining-pin 34 (as a substitute for the aforesaid screw-stop 30), which is adapted to project (when the clip is in place) into one of the holes 32 or 33 of said screw, and thus engage the screw for preventing the same from turning in either direction.

In Figs. 1 and 2 the ends 35 and 36 of the tire are shown one formed with an internal "V" and the other with an external "V," the two ends being interlocked and held in firm engagement. When it is required to close up the tire, the pointed end 35 of the tire is to be reduced in length, or cut off, to permit the closing of the tire by the required movement for bringing the wheel into the proper state of compression for sustaining the work demanded of it. And by this means, by simply filing off said pointed tire-end 35, the wheel may be strained up to overcome the effects of shrinkage of the fellies and spokes. This is particularly advantageous in dry countries and seasons, and with wagons on long journeys where the facilities of the wagon-smith cannot be had; for by removing the slip C and separating the ends of the tire by means of the screw S, the tire-end 35 may be filed away, and afterward the parts put together and the tire firmly closed, making the wheel ready for use.

In some cases, and especially for broad tires, I may use the modified tire-joint illustrated by the partial plan view shown in Fig. 10. According to this modification, one end, 38, of the tire has formed therein the slot 40, while the opposite tire-end 37 has the tongue 39 fitting in said slot, the two tire-ends being thus made to interlock and adapted for longitudinal adjustment by sliding engagement. In this figure the aforesaid studs 20 and 22 are shown by dotted lines, and are designated by the same characters as shown in the preceding figures of drawings.

Having thus described my invention, I claim—

1. In a vehicle-wheel, the combination with the felly, of the severed tire having inwardly projecting studs formed integral therewith extending beyond the inner face of the felly and screw-threaded at their ends, a right and left-handed screw having transverse screw-threaded bearings in said studs adapted to be turned to clamp the ends of the tire together, and a clip secured by nuts to said studs and to the inner face of the felly, substantially as and for the purpose described.

2. In a vehicle-wheel, the combination with the adjacent felly sections, mortised as set forth, of the tire having interlocking tire-ends formed integral therewith and having screw-threaded portions which extend beyond the inner face of the felly, an adjusting-screw having right and left-hand screw-threaded bearings in said studs and having a centrally-arranged head as shown, and a clip secured by nuts to the ends of said studs and to the inner face of the felly, substantially as described.

3. In a vehicle-wheel, the combination with a sectional felly, of a tire having interlocking ends and projections to engage the felly to prevent lateral displacement, a clip having slotted openings therein to receive the screw-threaded ends of studs formed integral with the contiguous ends of the tire, which studs extend through said clip and are provided with nuts to hold the same in place, and the adjusting-screw extended through the studs and adapted to be turned to draw the ends of the tire together, substantially as described.

4. In a vehicle-wheel, the combination with the felly-sections F', F², of the divided tire having interlocking ends and integral inwardly-extended studs 20, 22, with screw-threaded ends, and having transverse screw-threaded openings therein as shown, the right and left-handed screw having an angular central head and having bearings in the openings in said studs, and the clip C secured to the ends of the studs by nuts which clamp the same to the felly, and having a projection or screw-stop 30 that bears against, or extends into, the head of the adjusting-screw and prevents accidental turning thereof, substantially as described.

5. In a vehicle-wheel, the combination with the hub, the spokes and the fellies, of the severed tire having the side-clips grasping the fellies at points adjacent to the spokes, and means for adjustably closing the tire onto the fellies, substantially as described.

ALVIN S. FLINT.

Witnesses:
FRANCIS H. RICHARDS,
FRED. J. DOLE.